United States Patent

Philipp et al.

[11] Patent Number: 5,121,637
[45] Date of Patent: Jun. 16, 1992

[54] GAS CYLINDER GAUGE

[75] Inventors: Juergen D. Philipp, Mississauga, Canada; Kenneth O. Miller, East Amherst, N.Y.

[73] Assignee: Union Carbide Canada Limited, Canada

[21] Appl. No.: 648,853

[22] Filed: Jan. 31, 1991

Related U.S. Application Data

[62] Division of Ser. No. 470,242, Jan. 25, 1990.

[51] Int. Cl.$^5$ ................................. G01L 7/04
[52] U.S. Cl. ........................... 73/742; 73/756
[58] Field of Search ............ 73/742, 743, 741, 756, 73/714

[56] References Cited

U.S. PATENT DOCUMENTS 3,222,933 12/1965 Howard ........................ 73/742
3,641,820 2/1972 Bissell ........................... 73/743
3,815,417 6/1974 Smialowicz .................... 73/742
3,815,421 6/1974 Harland et al. ................ 73/743

*Primary Examiner*—Ronald O. Woodiel
*Attorney, Agent, or Firm*—Shoemaker and Mattare, Ltd.

[57] ABSTRACT

A gauge is described for measuring the gas pressure in high pressure gas cylinders. The gauge is mounted in the high pressure port of the cylinder valve, while gas is delivered through a lower pressure portion. The gauge comprises a cylindrical housing and a retaining nut, with the housing rotatable relative to the retaining nut. The cylindrical housing encloses a coiled bourdon tube which communicates with the gas in the cylinder and coils up or uncoils in response to changes in pressure. A viewing glass encloses a pointer and scale arrangement seated in the housing to permit the gas cylinder pressure to be displayed.

3 Claims, 1 Drawing Sheet

GAS CYLINDER GAUGE

This is a division, of application Ser. No. 07/470,242, filed Jan. 25, 1990.

FIELD OF INVENTION

The present invention relates to the measuring of gas pressures and, in particular, to a gauge for measuring the pressure in certain high pressure gas cylinders.

BACKGROUND TO THE INVENTION

Gases, such as oxygen, nitrogen and argon, are delivered to a use point in a number of ways. When the use of such gases requires relatively small quantity of gas at one time, such as in metal cutting, welding, blanketing or metal fabrication operations, the gas typically is delivered to the use point and stored there in a gas storage cylinder.

A recent very significant advancement in the field of such gas storage vessels, such as gas cylinders, is the high strength cylinder described and claimed in U.S. Pat. Nos. 4,461,657 and 4,578,113, the disclosures of which are incorporated herein by reference. This new gas storage cylinder enables the storage and transport of significantly more gas than is possible in a conventional cylinder of comparable size and weight because the gas can be safely maintained within the new gas storage cylinder at a pressure much higher than that possible with such conventional cylinders. For example, whereas a conventional cylinder may safely hold gas at a pressure up to about 2700 psia, the new high pressure gas storage cylinder may safely hold gas at a pressure up to about 4500 psia.

Gas is used at a use point at a defined pressure or pressure range. Generally, this use pressure is less than the pressure of the gas source and typically is around 50 psig. In such cases, a pressure regulator is employed to cause a reduction in the gas pressure and to ensure that the pressure of the gas going to the use point does not exceed the allowable use point pressure limit. The new gas storage cylinder provides gas at a pressure significantly in excess of the conventional pressures and thus at a pressure greater than that which can be handled by conventional regulators.

Once the new high strength gas storage cylinder is empty of gas, it must be refilled. In order to retain the advantages of the high strength cylinder, it must be recharged at the high pressure. In U.S. Pat. No. 4,844,111, the disclosure of which is incorporated herein by reference, there is a described a regulator which is capable both of rendering a high pressure gas source compatible with a lower pressure use point and also enabling recharging of the high pressure gas source to a high pressure. For this purpose, the regulator is equipped with two outlet ports, one to be used by the user to withdraw gas and the other to be used for refill.

One of the problems associated with the new high strength gas cylinders equipped with this regulator is the lack of a contents gauge on the gas cylinder. This lack of a contents gauge is problematical to users of the cylinders, particularly with respect to mobile operations, where an operator desires to know how much gas is in the cylinder, so that he can ensure that sufficient gas is available for the expected activity.

SUMMARY OF INVENTION

In accordance with the present invention, there is provided a contents gauge for the high pressure cylinders which is designed to be located in the high pressure refill outlet port of the regulator described above.

Accordingly, in one aspect, the present invention provides a combination of elements, including a high pressure gas storage cylinder, which generally is enclosed at one end and exhibits leak-before-break behavior, and a valve-regulator assembly mounted on the storage cylinder. The valve-regulator assembly has a valve body with main conduit means in flow communication with high pressure gas in the storage cylinder and a high pressure gas outlet in direct flow communication with the main conduit means. The valve-regulator assembly also includes a regulator in direct flow communication with the main conduit means for preventing gas flow from the main conduit means to a lower pressure outlet downstream of the regulator at a pressure above a predetermined minimum.

The combination further includes a combination pressure gauge-plug mounted in the high pressure outlet to measure the gas pressure in the cylinder. The combination pressure gauge-plug comprises a cylindrical gauge mechanism and housing having bourdon tube means communicating with high pressure gas in the main conduit means and a retaining nut threadedly received in the high pressure outlet and mounting the housing in the high pressure outlet When it is desired to refill the gas storage cylinder, the combination pressure gauge-plug is removed from the high pressure outlet and the cylinder is refilled through that outlet. The combination gaugeplug, therefore, replaces the conventional plug normally positioned in the high pressure outlet prior to shipping to the customer. When the gauge is removed from the high pressure outlet, a retaining spring may be mounted on the housing to maintain the housing and nut in an assembled condition.

The housing is rotatable with respect to the retaining nut, so that the gauge may be positioned in any desired orientation irrespective of the position of the nut in the high pressure outlet. The gauge may include any desired form of visual display which indicates the pressure of the gas in the cylinder.

As described in the aforementioned U.S. Pat. Nos. 4,461,657 and 4,578,113, the high strength cylinder may comprise a shell of a low alloy steel consisting essentially of:

(a) from 0.28 to 0.50 weight percent carbon;
(b) from 0.6 to 0.9 weight percent manganese;
(c) from 0.15 to 0.35 weight percent silicon;
(d) from 0.8 to 1.1 weight percent chromium;
(e) from 0.15 to 0.25 weight percent molybdenum
(f) from 0.005 to 0.05 weight percent aluminum;
(g) from 0.04 to 0.10 weight percent vanadium;
(h) not more than 0.040 weight percent phosphorus;
(i) not more than 0.015 weight percent sulfur;
(j) calcium in a concentration of from 0.8 to 3 times the concentration of sulfur, a rare earth element(s) in a concentration of from 2 to 4 times the concentration of sulfur; and
(k) the remainder iron.

Such gas cylinders are enclosed at one end and exhibit leak-before-break behavior. By using such alloy to construct the cylinder, increased cylinder efficiency, ultimate tensile strength, fracture toughness and fire resistance are achieved. The ultimate tensile strength generally is at least 150 thousands of pounds per square inch and the fracture toughness is at least 70 ksi square root inch.

As described in the aforementioned U.S. Pat. No. 4,844,111, the valve-regulator assembly renders a high pressure gas source compatible with a lower pressure use point. The regulator may comprise a spring-loaded piston, a sensing chamber at one end of the piston and sealing plug at the other end of the piston. The plug is capable of stopping gas flow from the main conduit when high pressure is present in the sensing chamber.

In another aspect of the invention, there is provided a gauge mechanism for determining the pressure of an enclosed gas atmosphere including a plurality of elements including a generally cylindrical body member having a first outer region of uniform diameter and a second outer region of increased. An axial elongate bore extends within the body member and communicates at one end with an enlarged cylindrical recess having a transparent cover, indicia means designating a pressure scale and pointer means and communicates at the other end with a narrow bore.

A copper or other suitable metal tube of diameter generally corresponding to that of the narrow bore has a portion thereof extending through the narrow bore and opening to exterior of the body member and usually communicating with the gas atmosphere, a coiled portion thereof located in said elongate bore and a portion thereof operatively connected to said pointer means for positioning the pointer means relative to the indicia means in response to contraction and expansion of the length of the coiled portion.

The copper tube functions in accordance with the bourdon tube principle and the lengthening or shortening of the length of the coiled portion occurs in accordance with the pressure of the gas atmosphere being measured.

An annular retaining nut has an internal diameter corresponding to the outer diameter of the first outer region of the body member to be slidably received thereon and to abut at one end thereof against the second outer region. The nut also has an outer screw-threaded surface for screw threaded mounting of the gauge mechanism in a threaded bore.

A releasably engageable retaining ring is provided in abutment with the other end of the annular retaining nut to maintain the nut assembled with the body member and preferably is received in a recess in the first outer surface. When it is desired to position the gauge mechanism in the high pressure outlet of a gas cylinder, the retaining ring is removed.

DESCRIPTION OF PREFERRED EMBODIMENT

Figure 1:
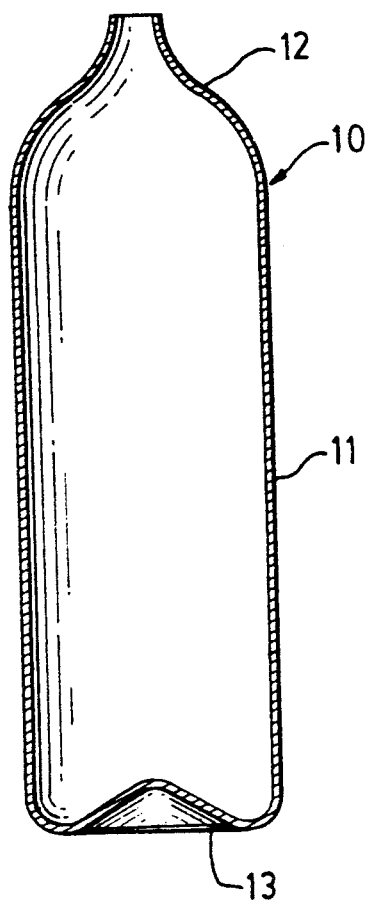
FIG. 1 is a simplified cross-sectional view of gas storage cylinder of typical design to which a pressure gauge is to be applied.
Figure 3:
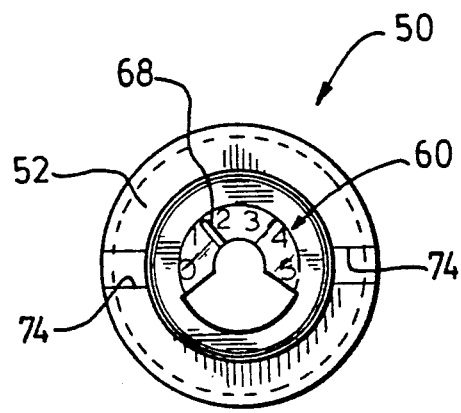
FIG. 3 is a front elevational view of a contents gauge of construction in accordance with one embodiment of the invention.
Figure 4:
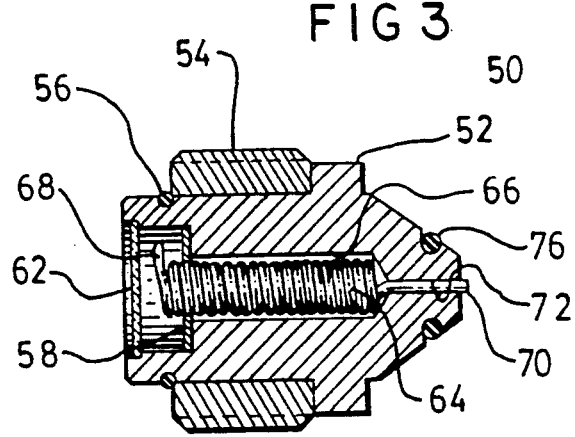
FIG. 4 is a longitudinal sectional view of the contents gauge of FIG. 3.
Figure 2:
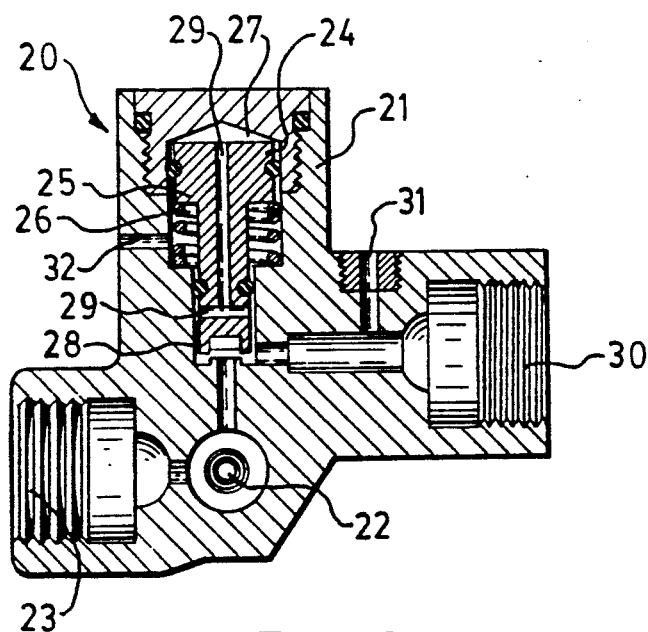
FIG. 2 is a plan cross-sectional view of a valve-regulator used in conjunction with the gas storage cylinder of FIG. 1 to provide high and low gas pressure outlets.

Referring to the drawings, a gas storage cylinder 10 is composed of a shell comprising a cylindrical midsection 11 having a relatively uniform sidewall thickness, a bottom wall portion 13 which is somewhat thicker than the sidewall, and a top portion 12 which forms a narrowed neck region to support a gas valve and regulator 20 (FIG. 2) to fill and discharge gas from the cylinder 10. The bottom portion 13 of the cylinder 10 is formed with a inward concave cross-section in order to be able to more suitably carry the internal pressure load of the cylinder 10. The cylinder 10 is intended to stand upright on the bottom portion.

The valve regulator assembly 20 mounted on the cylinder 10 comprises a valve body 21 having a main conduit 22 capable of flow communication with the high pressure contents of the cylinder 10.

A high pressure outlet 23 is in direct flow communication with the main conduit 22. In this way, gas at high pressure may flow through the outlet 23, through the main conduit 22 and into the cylinder 10, so as to recharge the cylinder at high pressure. In addition, high pressure from the cylinder 10 may flow through the main conduit 22 and through the high pressure outlet 23, so as to deliver gas at high pressure in the event that such high pressure delivery is required.

Also provided in direct flow communication with the main conduit 22 is a regulator 24. The regulator 24 comprises a piston 25 loaded by a spring 26. A sensing chamber 27 is provided at one end of the piston 25 and a sealing plug 28 is provided at the other end. A passage 29 communicates between the sensing chamber 27 and a low pressure outlet 30, which is in flow communication with the main conduit means 22 and is downstream of the regulator 24.

A lower pressure burst disk assembly 31 communicates between the lower pressure outlet 30 and the outside of the valve body 21. The burst disk assembly comprises a burst disk with gasket which are sealed in place by a threaded plug having an open center to complete a properly sized passage for relief flow, if and when the disk bursts due to overpressure.

The regulator 24 is set to lock at a predetermined desired pressure by adjusting the compression of spring 26. For example, in the case where the high pressure gas in the cylinder 10 is at 4500 psia and the use point equipment at the interface can handle gas at a maximum pressure of 3000 psia., the regulator 24 would be set to lock at a lower pressure, such as 2000 psia, thus ensuring that gas exceeding the use point maximum pressure is not delivered, in the following manner.

With the high pressure outlet 23 plugged off, such as by the contents gauge of the present invention, as described below, gas flows from the high pressure cylinder 10 through the main conduit 22 and lower pressure outlet 30, and then on to a lower pressure use point. A conventional step-down regulator may be positioned upstream of the lower pressure use point to further decrease the pressure. The pressure of the gas within the lower pressure outlet 30 depends on the rate at which the use point is using the gas. Should the pressure in the lower pressure outlet 30 rise to the 2000 psia level of this example, then gas flowing through the conduit 29 will deliver this pressure to the sensing chamber 27, causing the spring-loaded piston 25 to move sealing plug 28 into the position blocking off the passage from the main conduit 22 so as to stop gas flow. When the pressure in the lower pressure outlet 30 decreases below the setpoint, then the piston 25 moves back and gas flow is resumed.

In this way, the use point sees gas only at conventional pressure and not the high pressure in the cylinder 10. Because of the high pressures involved, two precautions are built into the assembly. The burst disk assembly 31 serves to ensure that should the regulator 24 fail, then high pressure gas will be released through the burst disk assembly and hence not cause harm downstream. In addition, the chamber for springs 26 is vented to the outside of the valve body 21 through a passage 32, thereby ensuring that, should high pressure gas pass by the O-ring seal on either side of springs 26, such gas will be vented out of the assembly and not cause spring malfunction leading to regulator malfunction.

In order for the user to determine the actual pressure of gas in the cylinder 10, a contents gauge 50 is screwed into the high pressure outlet 23, thereby fulfilling the dual function of a plug for the high pressure outlet 23 and a contents gauge.

The contents gauge 50 comprises three parts, namely a gauge mechanism and housing 52, a threaded retaining nut 54 and a retaining spring 56. This three-part design permits the gauge to be maintained in an upright position at all times, regardless of the seating of the retaining nut 54.

The gauge mechanism and housing 52 comprises a dial 58 bearing indicia 60 indicating the pressure and a lens 62 enclosing the dial 58. A coiled hollow copper tube 64 is located in an elongate axial bore 66 within the housing and has a first closed-end tail piece 68 which acts as a pointer associated with the dial 58 and a second open-end tail piece 70 projecting in sliding relation with a narrow bore 72 communicating between the axial bore 66 and the exterior of the gauge 50.

The retaining spring 56 is used solely to maintain the assembly 50 together when it is not mounted in the high pressure outlet 23. The retaining nut 54 is provided with slots 74 to permit the use of a tool to install and remove the gauge assembly 50. A sealing ring 76 may be mounted to the inner end of the gauge mechanism and housing 52.

When the assembly 50 is mounted in the high pressure outlet 23 of the regulator 20, the pressure of the gas in the cylinder 10 is continuously measured using the bourdon-tube principle. Different pressures in the cylinder 10 cause the copper tube 64 to deform elastically to varying degrees, resulting in a corresponding coiling and uncoiling of the copper tube 64, thereby affecting the specific orientation of the tail piece or finger 68. The coiling or uncoiling of the copper tube 64 in response to differences in pressure causes the tail piece 68 to change position relative to the indicia 60, thereby indicating the pressure in the cylinder 10.

In this way, the user is able to determine accurately the contents of the cylinder 10, even though a low pressure only is required to be delivered to the use site. When the cylinder 10 is required to be refilled, the assembly 50 is removed from the high pressure outlet 23 and the cylinder 10 is filled. Once the cylinder 10 is full, the assembly 50 is replaced in the high pressure outlet 23.

SUMMARY OF DISCLOSURE

In summary of this disclosure, the present invention provides a novel contents gauge for a high pressure gas cylinder which also acts as a plug for a high pressure outlet from the cylinder. Modifications are possible within the scope of this invention.

What is claimed is:

1. A gauge mechanism for determining the pressure of an enclosed gas atmosphere, which comprises:
   a generally cylindrical body member having a first outer region of uniform diameter and a second outer region of increased diameter,
   an axial elongate bore extending within said body member and communicating at one end with an enlarged cylindrical recess having a transparent cover, indicia means designating a pressure scale and pointer means and communicating at the other end with a narrow bore, and
   a tube of diameter generally corresponding to that of the narrow bore having a portion thereof extending through said narrow bore and opening to exterior of the body member, a coiled portion thereof located in said elongate bore and a portion thereof operatively connected to said pointer means for positioning said pointer means relative to said indicia means in response to contractions and expansions of the length of said coiled portion,
   an annular retaining nut having a internal diameter corresponding to the outer diameter of said first outer region of said body member to be slidably received therein and to abut at one end thereof against said second outer region and an outer screw threaded surface for screw threaded mounting of said gauge mechanism in a threaded bore, and
   a releasably engageable retaining ring in abutment with the other end of said annular retaining nut to maintain said nut assembled with said body member.

2. The gauge mechanism of claim 1 wherein said retaining ring is received in a recess in the surface of said first outer region of said body member.

3. The gauge mechanism of claim 2 wherein said second outer region of enlarged diameter is provided adjacent one end of said body member and said body member tapers inwardly from said second outer region to said one end.

* * * * *